United States Patent [19]

Chu

[11] Patent Number: 5,305,295
[45] Date of Patent: Apr. 19, 1994

[54] EFFICIENT METHOD AND APPARATUS FOR ACCESS AND STORAGE OF COMPRESSED DATA

[75] Inventor: Ke-Chiang Chu, Saratoga, Calif.

[73] Assignee: Apple Computer, Inc., Cupertino, Calif.

[21] Appl. No.: 905,558

[22] Filed: Jun. 29, 1992

[51] Int. Cl.5 .............................................. G11B 17/22
[52] U.S. Cl. ........................................ 369/30; 369/32; 341/55; 364/DIG. 1; 360/72.2
[58] Field of Search ............... 369/30, 32; 360/72.2; 358/133; 395/250, 425; 341/55; 364/200

[56] References Cited

U.S. PATENT DOCUMENTS 4,467,421 8/1984 White .................................. 395/425
4,782,325 11/1988 Jeppsson et al. ..................... 341/55

Primary Examiner—Robert J. Pascal
Assistant Examiner—Haissa Philogene
Attorney, Agent, or Firm—V. Randall Gard

[57] ABSTRACT

Storage and access of compressed data via separately compressed and stored variable size logical blocks. Portions of an uncompressed data file are compressed until they reach a logical block size which matches a given sector size or block of storage space. Then that compressed logical block (portion of compressed data) is stored into a sector allocated to it and a table is built correlating the range of original compressed data to the sector storing the compressed data. In this way, data is compressed into a block size which matches the characteristics of the particular storage medium used. Thus the present invention efficiently stores compressed data by filling allocated sectors. When it is desired to read a given portion of data within a stored compressed data file, it is first determined where within the original data file the desired portion resided. Then, the table created as part of the compression and storage sequence is used to determine which sector contains the desired data. Thus, the direct access capability of compressed and stored data is maintained. Furthermore, because each block of data is separately compressed and stored, no other block needs to be retrieved in order to decompress and read the desired portion of data.

20 Claims, 6 Drawing Sheets

EFFICIENT METHOD AND APPARATUS FOR ACCESS AND STORAGE OF COMPRESSED DATA

This patent application relates to copending patent applications having the following patent application serial numbers and filing dates: Ser. No. 07/905,984, filed Jun. 29, 1992; Ser. No. 07/906,051, filed Jun. 29, 1992; and Ser. No. 07/905,712, filed Jun. 29, 1992. This patent application and these copending patent applications are commonly owned at the time of filing of this patent application.

FIELD OF THE INVENTION

The present invention relates to the field of computers and electronic devices. More specifically, the present invention relates to the way compressed data is stored and accessed.

BACKGROUND OF THE INVENTION

Data for multimedia applications is generally less sequential than data of a typical data file which tends to follow a straight-line sequence from one portion or block of data in the data file to the next successive (immediately following or contiguous) portion or block of data in the data file. Instead, multimedia data, in particular, must be capable of fast direct access to any portion of a data file in response to the demands of the multimedia device, system, or user, regardless of the size of the data file.

Direct or random data access is a concept which allows a system or user to directly access a given portion of a data file based upon the known structure and size of the data file and upon the addressability of certain storage media such as system memory or magnetic disk without having to access and read the entire data file. It is for this reason that magnetic discs are often referred to as Direct Access Storage Devices (DASD) and some memory devices are referred to as Random Access Memory (RAM).

The typical storage sequence of the prior art when storing data to a magnetic disk first divides a data file into logical blocks which match the block size of the storage medium used. Then, sectors are allocated as needed by the number of logical blocks obtained. Next, the logical blocks are stored into the allocated sectors and a "mapping" is maintained correlating the logical blocks to the physical sectors. Then, when one desires to do a read of the stored data, one need merely determine which logical block contains the desired data and access the appropriate sector.

The overwhelming trend, particularly with multimedia data which oftentimes combines sound and images, is an ever increasing size of modern data files. Thus, compression of data files is becoming increasingly important.

It is typical in the art to compress an entire data file as a single unit. Then, as in the prior art method of storing uncompressed data files, one would divide the compressed data file into logical blocks. Then, sectors would be allocated as needed and the logical blocks of compressed data file would be stored into the allocated sectors.

Unfortunately, it is inefficient to read a compressed data file stored according to the known methodologies. Once a data file has been compressed and stored as a single unit then the random access capability can become lost. This is because the known structure and size of the data file has been altered by the compression process. Because one doesn't know which portion of the original uncompressed data file correlates to any portion of the stored compressed data file (since no "mapping" between uncompressed and compressed), one must retrieve and decompress the entire compressed file in order to access even a small portion of the file. Then, in order to return the compressed data file to storage, one must re-compress the entire data file and store it via the process above.

Conversely, the present invention provides for efficient allocation of, and access to, stored compressed data files.

SUMMARY AND OBJECTS OF THE INVENTION

An objective of the present invention is to provide an improved method for storing and accessing compressed data.

A further objective of the present invention is to provide an improved apparatus for storing and accessing compressed data.

The foregoing and other advantages are provided by a method of data storage and access in a storage medium subdivisible into separately addressable segments, said data storage and access method comprising compressing said data file into separate blocks of a predetermined size, storing each said predetermined size compressed logical block of said data file into said storage medium segments, and mapping said uncompressed logical blocks of said data file to said storage medium segments containing said compressed logical blocks of said data file, said mapping providing an access correlation between each said uncompressed logical block and each said storage medium segment containing said compressed logical block of each said uncompressed logical block.

The foregoing and other advantages are also provided by an apparatus for data storage and access in a storage medium subdivisible into separately addressable segments, said data storage and access apparatus comprising means for compressing said data file into separate blocks of a predetermined size, means for storing each said predetermined size compressed logical block of said data file into said storage medium segments, and means for mapping said uncompressed logical blocks of said data file to said storage medium segments containing said compressed logical blocks of said data file, said mapping providing an access correlation between each said uncompressed logical block and each said storage medium segment containing said compressed logical block of each said uncompressed logical block.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 2:
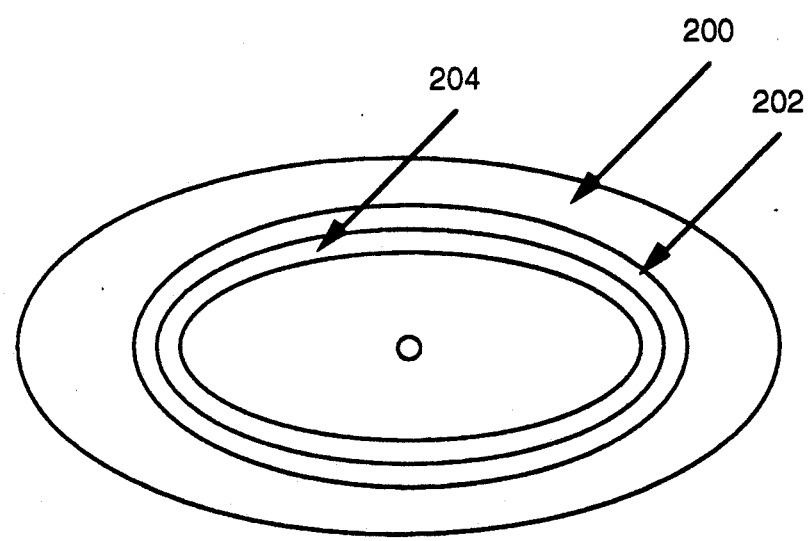
FIG. 2 depicts a typical storage medium, magnetic disk media (also commonly known as a direct access storage device), of the prior art.

Referring now to FIG. 2, magnetic disk media, a typical storage medium well known in the art, is shown. Magnetic disk media is usually formed onto a disk known as a platter 200. Disk platter 200 is generally formatted into multiple concentric rings known as tracks 202. Tracks 202 are generally formatted into multiple segments known as sectors 204. As is well known in the art, data stored onto magnetic disk media is thus directly accessible by addressing the track and sector location (and platter number if there are multiple platters) for that data. This magnetic disk addressability thus provides a logical-to-physical mapping in that a logical block or portion of data within a given file stored on disk media has an address corresponding to its physical location on the disk.

Figure 3:
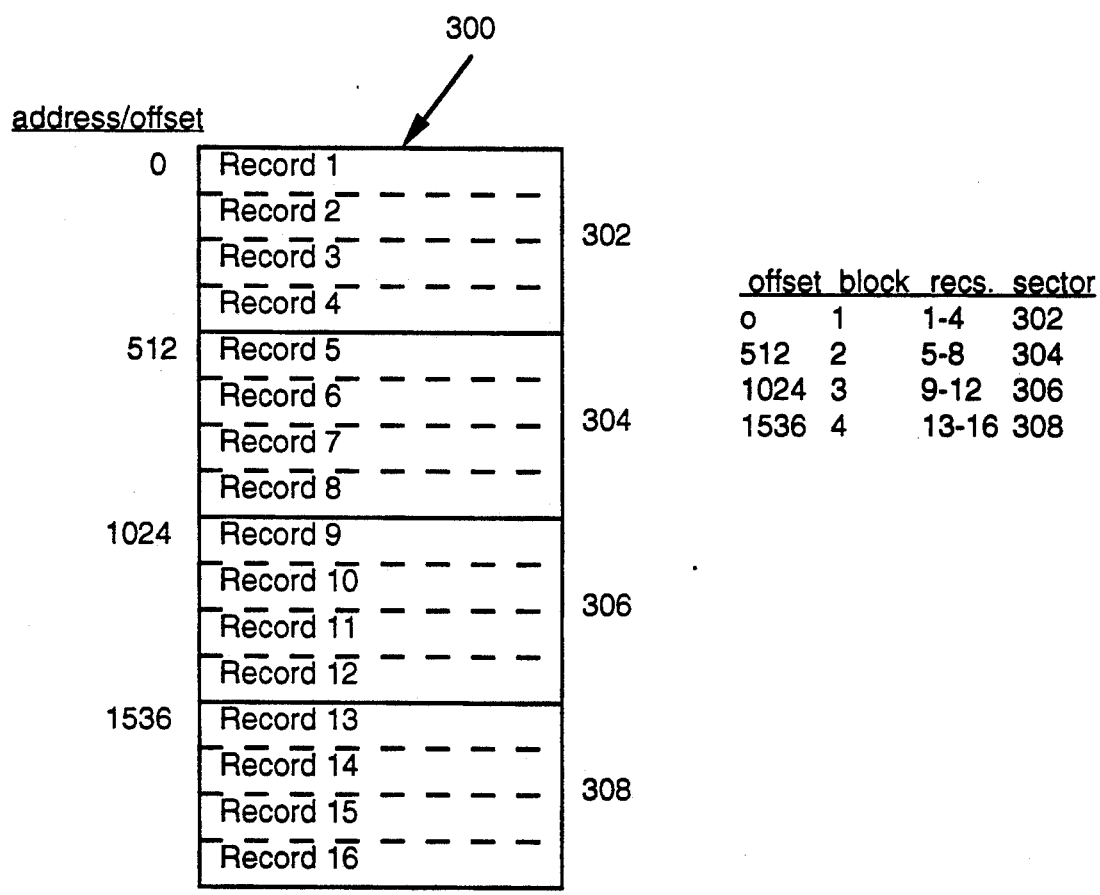
FIG. 3 depicts a typical uncompressed data storage approach of the prior art.

When data files are to be stored on magnetic disk media, as was explained above, it is common to break the data file down into smaller logical blocks in order to fit the data file onto the sectors of the disk media for storage. For example, a data file could be divided into logical blocks of 512 bytes each to match sectors of that size. For example, referring now to FIG. 3, if a given data file contained multiple 128 byte records and was stored on magnetic media having 512 byte sectors then the data file would be broken down into 512 byte logical blocks of four 128 byte records each. Then, space for each 512 byte logical block would be obtained by allocating one sector of the disk for each logical block. Thus each allocated sector could contain four records and is shown in the figure as four 512 byte sectors denoted 302 (containing records 1-4), 304 (containing records 5-8), 306 (containing records 9-12), and 308 (containing records 13-16).

Furthermore, to support direct access to the logical blocks of the data file stored on the magnetic disk, a table could be generated as the logical blocks are stored into the allocated sectors. The table would show the correlation or mapping between the logical blocks (and/or which record(s) each logical block contains) and the allocated sectors. This table could later be used as a simple look-up function to translate between the logical structure of the records of the data file and the physical location where the data was stored on the magnetic disk media.

Alternatively, the record size versus the sector size could be used as a translation function between the records of the data file and the physical location where the data was stored on the magnetic disk media. The translation function could be as simple as an offset value (from the beginning of the data file to the desired record) correlated to the sector which contains the data coinciding with that offset. This translation function could be implemented as either a look-up table function or as a calculable value.

Then, when it was desired to read a given record stored on magnetic disk media, one would first determine which logical block and/or sector contained the desired record and retrieve that block or record. One approach would be to use the look-up table while an alternative approach would be to utilize the translation function. For instance if it was desired to read record 10, then the sector containing the third logical block, sector 304, could be directly accessed and only the four records (records 9-12) stored in that sector would need to be retrieved in order to locate the desired record. Furthermore, if it was known that each record contained 128 bytes and each sector held 512 bytes and that the desired record was the second record stored in the read sector then once the addressed sector were read into system memory it would be a simple matter of skipping over the first 128 bytes of the retrieved sector in order to reach the desired record. Again, this shows the direct or random access capability of data stored on magnetic disk media.

Figure 1:
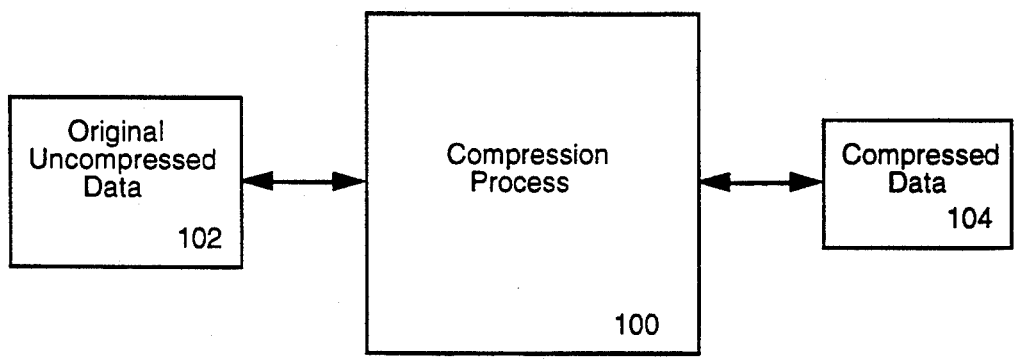
FIG. 1 depicts a typical compression sequence of the prior art.

Referring now to FIG. 1, a typical compression sequence will be explained. In a typical compression sequence of the prior art, an entire original uncompressed data file 102 passes through a compression process 100. Compression process 100 compresses the original uncompressed data 102 as a single unit or entity resulting in a unified compressed data file 104. Note that decompression is merely the reverse operation where compressed data file 104 becomes uncompressed data file 102. Compressed data file 104 is generally smaller than uncompressed data file 102 due to compression process 100 (although some data does not lend itself well to compression processes and actually result in larger data files when compressed). The relative size of original uncompressed data 102 versus compressed data 104 is known in the art as a compression ratio.

It is common in the art to store a compressed data file according to the following methodology. First, the compressed data file (again, compressed as a single entity) is divided into logical blocks of a size which matches the sector size of the particular disk/storage medium being used. Then, storage space is obtained for the logical blocks by allocating the necessary number of sectors. Finally, the compressed logical blocks of the data file are stored into the allocated sectors while building or maintaining a table or translation mapping between the data file and the allocated sectors.

Figure 4:
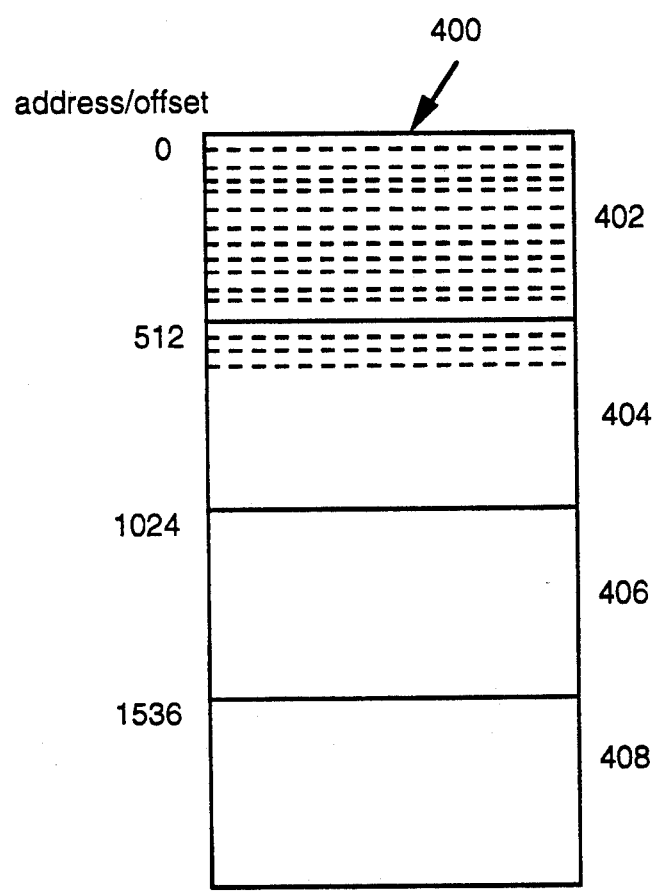
FIG. 4 depicts a typical compressed data storage approach of the prior art.

For example, if an original uncompressed data file containing multiple 128 byte records (as was shown in FIG. 3) were compressed and ready to be stored, and if the particular magnetic disk used for storage had sectors of 512 bytes, then the compressed data file would be divided into 512 byte logical blocks. Thus the compressed data file would be stored on the magnetic disk such that, referring now to FIG. 4, the first logical block would contain 12 records and would be stored in sector 402 while the second 512 byte logical block would contain the remaining 4 records (and any further records which had compressed into the second 512 byte logical block of the compressed data file) and would be stored in sector 404. Note that, as is well known in the art, the allocated sectors 402 and 404 need not be contiguous on the disk media. This thus shows the typical compression and disk storage scheme of the prior art.

Note, however that the direct access capability of the original uncompressed data file appears to be lost with the prior art compression and storage methodology. Remember that it was a relatively simple matter to determine which sector contained any given record within the original uncompressed data file (see the discussion above with reference to FIG. 3). However, that is not the case now that the original data file has been compressed (referring again to FIG. 4) because there is no direct access to any known portion of the data file. It is possible, of course, to directly access any given sector. However, because the entire data file was compressed as a single unit, there is no simple way to know where within the compressed data file the desired portion resides. If one now wishes to access record 10, for example, one doesn't know which sector of the stored compressed data file would contain that record. Therefore, the entire compressed data file must be retrieved by retrieving all the allocated sectors containing any portion of the compressed data file. Therefore, with compressed data files of the prior art the random access capability of data is lost which means that direct access can only occur at the file level and not at the record level.

Furthermore, once one has retrieved the entire compressed data file one still don't known where the desired portion resides within the compressed data file. Therefore, one must decompress the entire retrieved compressed data file in order to locate and read just the desired portion. Still further, retrieving and decompressing the entire data file may be impractical with large data files which may exceed the size of available system memory and which may take an unreasonable amount of processor time to decompress. Finally, one must re-compress the entire data file before the data file can be stored back to disk memory. Of course, re-compressing the entire data file takes more processor time than merely re-compressing the desired portion. And writing the entire re-compressed data file back to disk memory takes more processor, input/output bus and disk time than merely writing the desired portion back to disk memory.

However, with the system of the present invention fast random access of compressed data is still possible, as will now be explained.

In the compression and storage system of the present invention, portions of the original uncompressed data file are compressed until they reach a logical block size which matches a given sector size or block of storage space. Then that compressed logical block (portion of compressed data) is stored into a sector allocated to it and a table is built correlating the range of original compressed data to the sector storing the compressed data. In this way, data is compressed into a block size which matches the characteristics of the particular storage medium used. Thus the present invention efficiently stores compressed data by filling allocated sectors.

Then, when it is desired to read a given portion of data within a stored compressed data file, it is first determined where within the original data file the desired portion resided. Then, the table created as part of the compression and storage sequence is used to determine which sector contains the desired data. Thus, the direct access capability of compressed and stored data is maintained. Furthermore, because each block of data is separately compressed and stored, no other block needs to be retrieved in order to decompress and read the desired portion of data.

Figure 6:
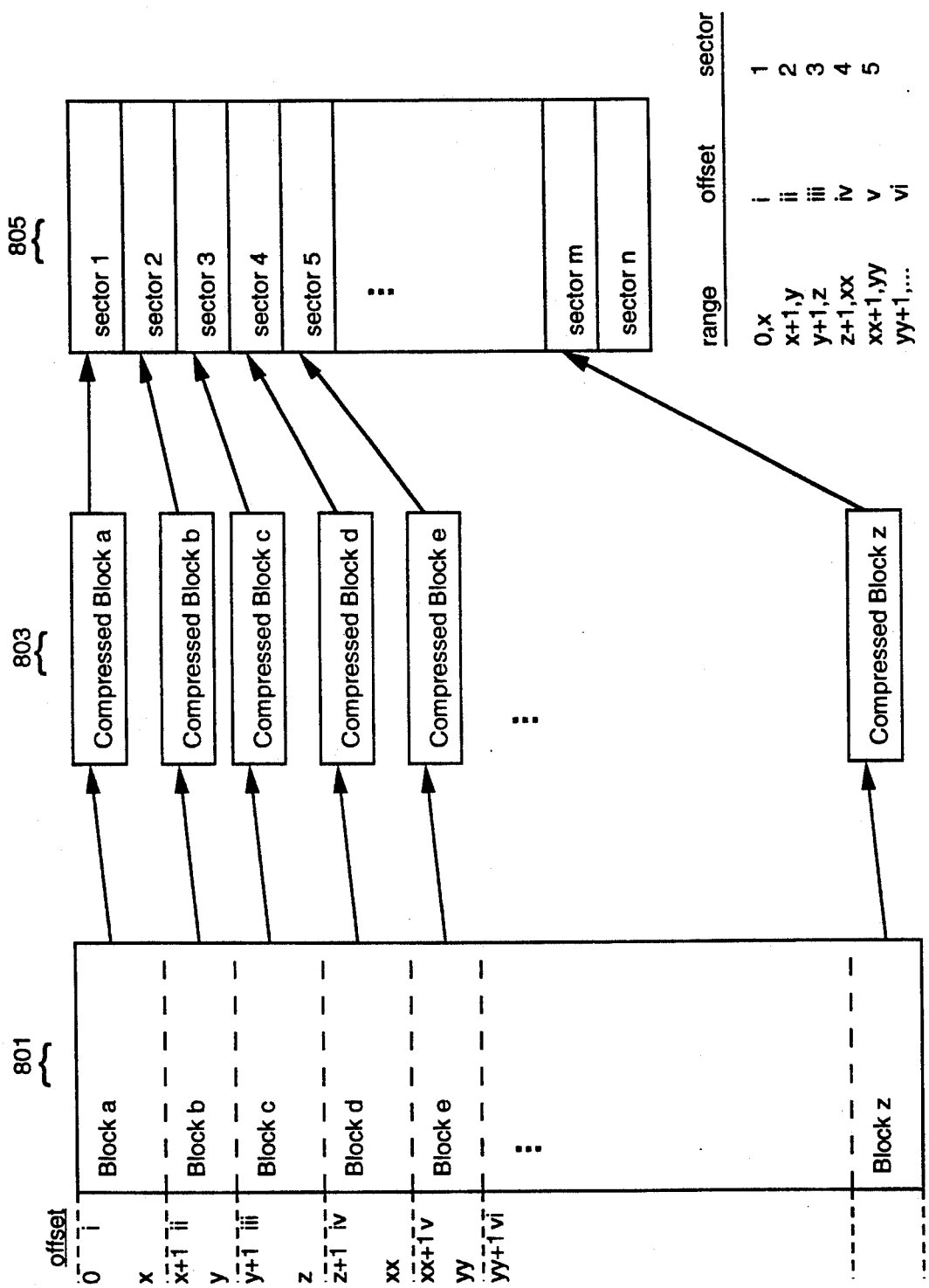
FIG. 6 depicts the compressed data storage approach of the present invention.

With reference to FIG. 6, the compression and storage of the present invention will now be explained in more detail. In this example, direct access storage 805 comprise sectors 1-m of a predetermined size. Portions of an original uncompressed data file 801 (Block a in this example) are initially compressed until a logical block (Compressed Block a in this example) which matches the predetermined sector size is obtained. The beginning offset value of Block a into data file 801 and the ending offset value of Block a into data file 801 are then used as an entry to a mapping table. Then, the compressed block (Compressed Block a in this example) is stored into a sector (sector 1 in this example) of direct access storage device 805 allocated for it. The sector which now contains Compressed Block a is entered in the mapping table as a companion entry to the offset values of uncompressed Block a.

The process is repeated by compressing further portions of original uncompressed data file 801 (Block b in this example) until another compressed logical block (Compressed Block B in this example) which also matches the predetermined sector size is obtained. The beginning offset value of Block b into data file 801 and the ending offset value of Block b into data file 801 are then used as an entry to the mapping table. Similarly, the compressed block (Compressed Block b in this example) is stored into a sector (sector 2 in this example) of direct access storage device 805 allocated for it. The sector which now contains Compressed Block b is entered in the mapping table as a companion entry to the offset values of uncompressed Block b.

This process is repeated until the end of file of data file 801 is reached and a final block (Block z in this example) of original uncompressed data file 801 is compressed into a logical block (Compressed Block z in this example) which is equal to or smaller than the predetermined sector size. The beginning offset value of Block z into data file 801 and the ending offset value of Block z into data file 801 are then used as an entry to the mapping table. Then the final compressed block (Compressed Block z in this example) is stored into a sector (sector m in this example) of direct access storage device 805 allocated to it. The sector which now contains Compressed Block z is entered in the mapping table as a companion entry to the offset values of uncompressed Block z.

Therefore, in the example of FIG. 6 and as was explained above, the table would provide the following logical to physical mapping:

| Offset | | | Sector(s) |
|---|---|---|---|
| 0 | → | x | = | 1 |
| x + 1 | → | y | = | 2 |
| y + 1 | → | z | = | 3 |
| Z + 1 | → | xx | = | 4 |
| xx + 1 | → | yy | = | 5 |
| yy + 1 | → | ... | = | ... |

Thus, whenever it was desired to read any portion of uncompressed data file 801, the first step would be to determine how far into data file 801 the desired portion originally was (e.g., the offset). Then, using the offset value, the above mapping table would indicate which sector to retrieve to obtain the desired portion. For example, if the desired portion of data file 801 was somewhere within block c then the desired portion was originally located (offset) between y+1 and z. Therefore, by referencing the mapping table for the offset range of y+1 to z, one would know to retrieve sector 3 in order to obtain the desired portion. Then, because each portion of data file 801 (e.g., logical Block c) is separately compressed, the retrieved sector correlating to a given logical block can be decompressed as a separate unit without reference to any other compressed portions of data file 801. Thus, when reading compressed stored data files of the present invention, direct access is still provided and only the logical block corresponding to the desired portion need be retrieved and decompressed. Thus, the present invention provides both direct access and fast decompression capability. Then, when the retrieved and decompressed data is to be returned to storage, the present invention provides further performance advantages because only the retrieved logical block needs to be re-compressed and written back to the storage medium.

Figure 5:
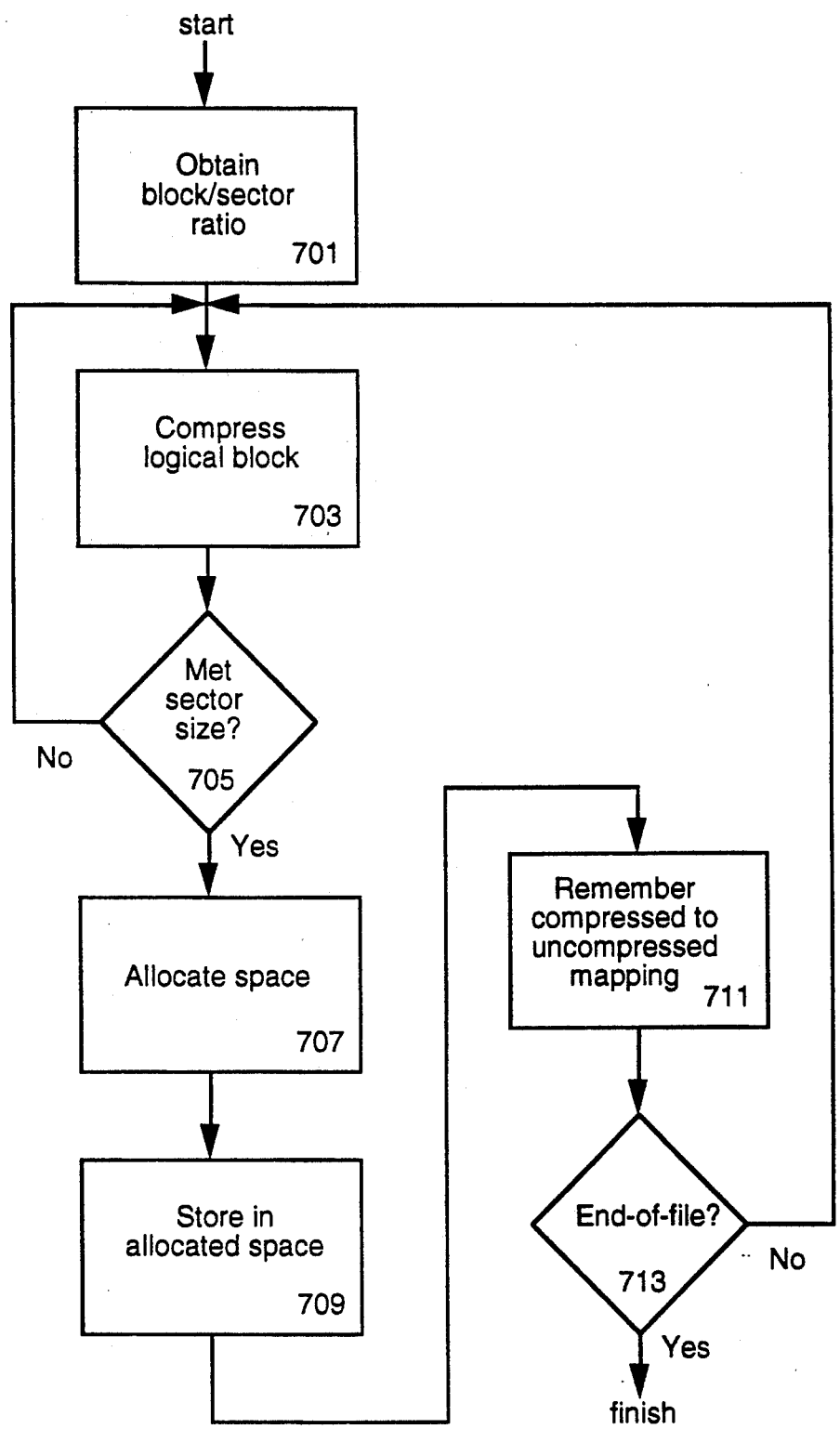
FIG. 5 is a flowchart of the compressed data storage approach of the present invention.

Referring to FIG. 5, the compression and storage system of the preferred embodiment of the present invention will be further explained. Beginning with an original uncompressed data file, the first step 701 is to obtain the block or sector size of the particular direct access storage medium being used. Then, the process of compressing the original uncompressed data file is begun, step 703. Once a compressed logical block of a size which matches the block or sector size is obtained, step 707, then compression temporarily suspends. Space is then allocated, step 707, for the compressed logical block based upon predetermined sector size. The compressed logical block is then stored, step 709, into the space allocated to it.

In the preferred embodiment of the present invention, an uncompressed-to-compressed mapping or correlation is maintained, step 711, in order to maintain the direct/random access capability explained above. This uncompressed to compressed mapping of the present invention can be provided through a table indicating which sectors contain which portions of the uncompressed data file via the offset values as was explained above.

Finally, if the end-of-file of the original uncompressed data file has been reached, step 713, then the compression and storage sequence is complete. Otherwise the process continues by compressing further portions of the original data file, step 703, and repeating the above sequence.

Thus, it has been explained that the random access capability of compressed data stored on magnetic disk media (or other direct access media) is still maintained with the system of the present invention. In other words, a desired record or portion of data would still be accessible without having to access, decompress and read the entire data file containing that record or portion. This is because a correlation or mapping between the structure of the uncompressed data file and the compressed data file has been maintained.

Note that this mapping or association can be extended to any logical block size and any sector size (or even to any number of multiple sectors as the compressed logical block size). For example, rather than compressing the original data file into compressed logical blocks which match the size of a single sector, it may be more efficient to compress portions of the data file into a block of a size which matches a multiple number of sectors. For example, if the given storage medium has 512 byte sectors, better compression may be achieved by utilizing two or three sectors as the compressed logical block target size. In that case, the mapping table would indicate which multiple sectors contain the desired portion of data. Note that indicating the multiple sectors can be accomplished by merely listing each sector used or by allocating contiguous sectors and merely listing the first sector and indicating the subsequent (or total number of) sectors used.

As was stated above, the present invention has further performance advantages when writing data back to the storage medium which contained the originally compressed block of data. Of course, the data may have been modified before it was recompressed and stored back to the storage medium. If the modification resulted in the logical block compressing to a degree such that the originally allocated space is now insufficient to contain the modified and compressed data then an overflow condition would occur upon writing the data back to the storage medium. When this overflow situation occurs the data within the re-compressed logical block remaining to be stored essentially has no storage space left allocated for it.

The present invention approach to handling an overflow condition is essentially an extended implementation of the approach originally followed to compress and store the original data file. With an overflow condition, however, only the portions of the data file from the altered variable size logical block to the end of the data file need to be dealt with. In other words, with the overflow handling operation of the present invention (again, when a stored variable size logical block is retrieved, decompressed and altered and will not recompress into the space originally allocated for it) all of the compressed and stored data file from the altered variable size logical block to the end of file will be retrieved and decompressed. Then, the same process of compressing those portions of the data file down until a sector size is met and allocating the necessary storage space sectors and repeating until the end of file is reached, as was done originally, will be completed. Again, the difference is that the entire data file is not retrieved, decompressed, re-compressed and restored, but rather, only from the altered block to the end of file.

Note that the capability and approach of the present invention apply equally well to any storage medium capable of storing data in fixed block sizes and capable of direct/random access to the address or location of the block or portion.

What is claimed is:

1. A method of data storage and access in a storage medium subdivisible into separately addressable segments, said data storage and access method comprising the following steps:
   a) compressing a data file into separate blocks of a predetermined size;
   b) storing each said predetermined size compressed logical block of said data file into said storage medium segments;
   c) mapping said uncompressed logical blocks of said data file to said storage medium segments containing said compressed logical blocks of said data file, said mapping providing an access correlation between each said uncompressed logical block and each said storage medium segment containing said compressed logical block of each said uncompressed logical block.

2. The data storage and access method of claim 1 further including the step of allocating only as many said storage medium segments as are necessary to contain each said compressed logical block of said data file.

3. The data storage and access method of claim 1 wherein said mapping is done during said storage step.

4. The data storage and access method of claim 3 wherein said access correlation is provided via a look-up table.

5. The data storage and access method of claim 4 wherein said predetermined logical block size is based upon the size of said storage medium segments.

6. The data storage and access method of claim 5 wherein said predetermined logical block size is in the range of two to four kilobytes.

7. The data storage and access method of claim 6 wherein said storage medium is a magnetic media direct access storage device.

8. The data storage and access method of claim 7 wherein said separately addressable segments are sectors of said magnetic media direct access storage device.

9. The data storage and access method of claim 8 wherein the size of said direct access storage device sectors is 512 bytes.

10. The data storage and access method of claim 1 further including the step of if any logical block of said data file is modified and re-compressed after being accessed and de-compressed then:
   i) storing said re-compressed and modified logical block of said data file into any of said storage medium segments which previously contained said compressed logical block of said data file if said re-compressed and modified logical block of said data file fits, else
   ii) retrieving all logical blocks from said modified logical block of said data file to the last logical block of said data file, de-compressing all logical blocks from said modified logical block of said data file to the last block of said data file, and repeating steps (a) through (c) on all logical blocks from said modified logical block of said data file to the last block of said data file.

11. A method of access to a data file compressed and stored in a direct access storage device, said direct access storage device having separately addressable sectors, said data file access method comprising the following steps:
   a) compressing a data file into separate blocks of a predetermined size;
   b) storing each said predetermined size compressed logical block of said data file into said direct access storage device sectors;
   c) mapping said uncompressed logical blocks of said data file to said direct access storage device sectors containing said compressed logical blocks of said data file, said mapping providing an access correlation between each said uncompressed logical block and each said direct access storage device sector containing said compressed logical block of each said uncompressed logical block.

12. The data storage and access method of claim 11 further including the step of allocating only as many said direct access storage device sectors as are necessary to contain each said compressed logical block of said data file.

13. The data storage and access method of claim 11 wherein said mapping is done during said storage step.

14. The data storage and access method of claim 13 wherein said access correlation is provided via a look-up table.

15. The data storage and access method of claim 14 wherein said predetermined logical block size is based upon the size of said direct access storage device sectors.

16. The data storage and access method of claim 15 wherein said predetermined logical block size is in the range of two to four kilobytes.

17. The data storage and access method of claim 16 wherein the size of said direct access storage device sectors is 512 bytes.

18. The data storage and access method of claim 11 further including the step of if any logical block of said data file is modified and re-compressed after being accessed and de-compressed then:
   i) storing said re-compressed and modified logical block of said data file into any of said direct access storage device sectors which previously contained said compressed logical block of said data file if said re-compressed and modified logical block of said data file fits, else
   ii) retrieving all logical blocks from said modified logical block of said data file to the last logical block of said data file, de-compressing all logical blocks from said modified logical block of said data file to the last block of said data file, and repeating steps (a) through (c) on all logical blocks from said modified logical block of said data file to the last block of said data file.

19. An apparatus for data storage and access in a storage medium subdivisible into separately addressable segments, said data storage and access apparatus comprising:
   a) means for compressing a data file into separate blocks of a predetermined size;
   b) means for storing each said predetermined size compressed logical block of said data file into said storage medium segments;
   c) means for mapping said uncompressed logical blocks of said data file to said storage medium segments containing said compressed logical blocks of said data file, said mapping providing an access correlation between each said uncompressed logical block and each said storage medium segment containing said compressed logical block of each said uncompressed logical block.

20. A method of data storage and access in a storage medium subdivisible into separately addressable segments, said data storage and access method comprising the following steps:
   determining a logical block size;
   compressing a data file into separate compressed data blocks, wherein said compressing step comprises, for each said compressed data block, compressing one or more uncompressed data blocks of said data file into said compressed data block until either a size of said compressed data block is equivalent to said logical block size or the end of said uncompressed data file is detected;
   storing each said compressed data block into each one of said separately addressable segments; and
   mapping each said one or more uncompressed data blocks of said data file to each said one separately addressable segment in which each said compressed data block associated with each said one or more uncompressed data block is stored.

* * * * *